(12) United States Patent
Naamad et al.

(10) Patent No.: US 8,935,490 B1
(45) Date of Patent: Jan. 13, 2015

(54) DISK ACCESS QUALITY OF SERVICE

(75) Inventors: Amnon Naamad, Brookline, MA (US); Sachin More, Northborough, MA (US)

(73) Assignee: EMC Corporation, Hopkinton, MA (US)

( * ) Notice: Subject to any disclaimer, the term of this patent is extended or adjusted under 35 U.S.C. 154(b) by 910 days.

(21) Appl. No.: 12/930,101

(22) Filed: Dec. 28, 2010

(51) Int. Cl.
*G06F 12/02* (2006.01)

(52) U.S. Cl.
USPC .................................. 711/158; 711/E12.003

(58) Field of Classification Search
None
See application file for complete search history.

(56) References Cited

U.S. PATENT DOCUMENTS

| | | | |
|---|---|---|---|
| 5,206,939 A | 4/1993 | Yanai et al. | |
| 5,778,394 A | 7/1998 | Galtzur et al. | |
| 5,845,147 A | 12/1998 | Vishlitzky et al. | |
| 5,857,208 A | 1/1999 | Ofek | |
| 6,697,367 B1 | 2/2004 | Halstead et al. | |
| 7,281,086 B1 | 10/2007 | More et al. | |

OTHER PUBLICATIONS

U.S. Appl. No. 12/924,361, filed Sep. 24, 2010, Marshak et al.

*Primary Examiner* — Charles Rones
*Assistant Examiner* — Ryan Dare
(74) *Attorney, Agent, or Firm* — Muirhead and Saturnelli, LLC

(57) ABSTRACT

Providing quality of service levels to a plurality of sources that perform access requests to a disk resource includes providing a disk resource queue containing access requests for the disk resource, providing a source queue for each of the sources containing access requests generated by a corresponding one of the sources, determining if a new access request from a particular source is urgent according to a specified number of I/O operations per second for the particular source and a time since a previous access request from the particular source, adding the new access request to the disk resource queue if the new access request is urgent, and adding the new access request the source queue of the particular source if the new access request is not urgent and the length of the disk resource queue is greater than a predetermined queue depth value.

20 Claims, 12 Drawing Sheets

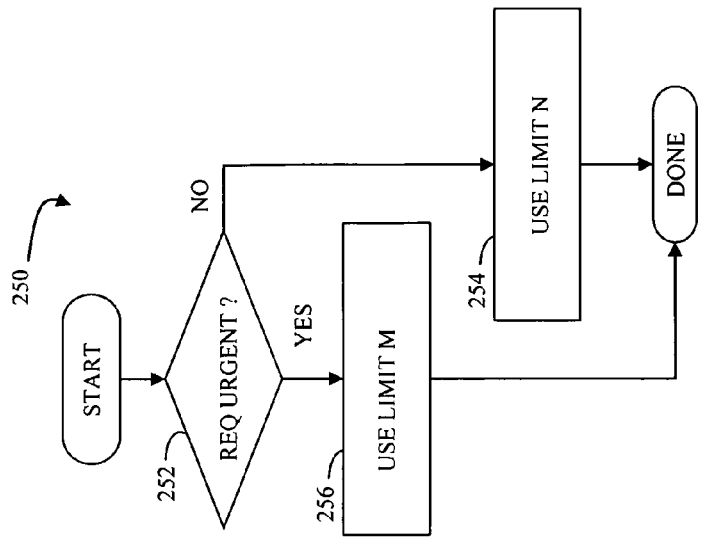
FIGURE 13
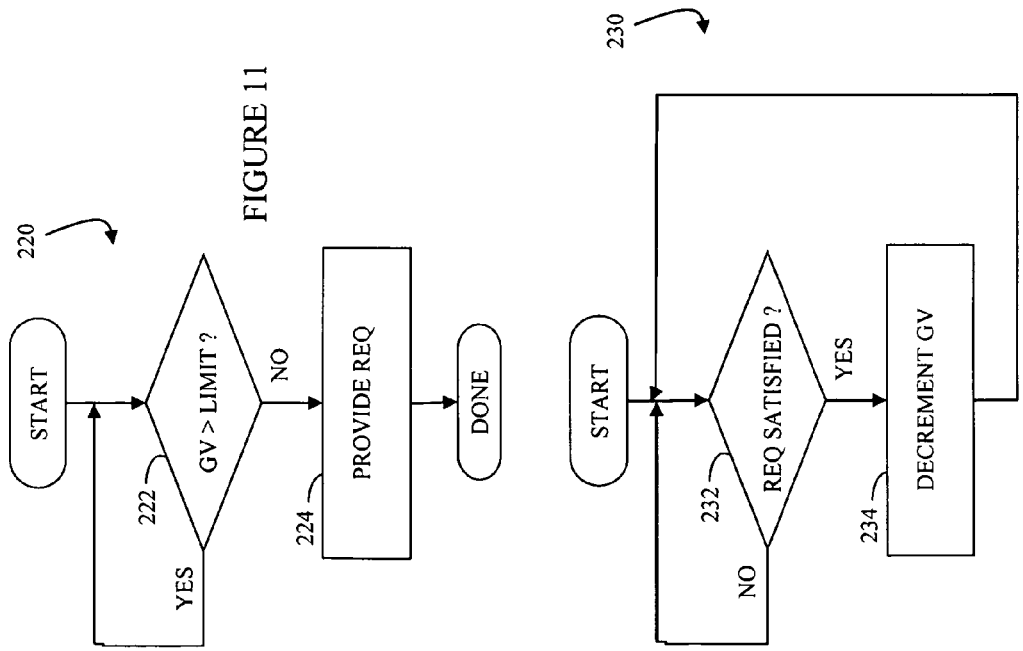
FIGURE 11
FIGURE 12

DISK ACCESS QUALITY OF SERVICE

BACKGROUND OF THE INVENTION

1. Technical Field

This application relates to computing devices, and more particularly to the field of providing appropriate quality of service for computing devices.

2. Description of Related Art

Host processor systems may store and retrieve data using storage devices containing a plurality of host interface units (host adapters), disk drives, and disk interface units (disk adapters). Such storage devices are provided, for example, by EMC Corporation of Hopkinton, Mass. and disclosed in U.S. Pat. No. 5,206,939 to Yanai et al., U.S. Pat. No. 5,778,394 to Galtzur et al., U.S. Pat. No. 5,845,147 to Vishlitzky et al., and U.S. Pat. No. 5,857,208 to Ofek. The host systems access the storage device through a plurality of channels provided therewith. Host systems provide data and access control information through the channels of the storage device and the storage device provides data to the host systems also through the channels. The host systems do not address the disk drives of the storage device directly, but rather, access what appears to the host systems as a plurality of logical volumes. The logical volumes may or may not correspond to the actual disk drives.

In a distributed computing environment, multiple storage devices, hosts, and perhaps other computing devices service requests that may be initiated from many independent other devices. For example, a number of independent hosts and other storage devices may request I/O's from a particular storage device. It is useful for the particular storage device to be able to provide appropriate quality of service to each requester. However, without a metric for doing so, it may be difficult for the particular storage device to determine how to order the independent requests from the different requesters.

Furthermore, independent sources may specify quality of service performance goals for disk access requests in the form of a requested number of I/O operations per second (IOSPS) and possibly also an average response time (RT). However, in the case of disk access requests, it may be difficult to provide each independent source of the requests with a minimum quality of service since disk performance for a particular source may not always be predictable when other sources are also making requests.

Accordingly, it is desirable to be able to attain quality of service performance goals for independent sources that make disk access requests.

SUMMARY OF THE INVENTION

According to the system described herein, providing quality of service levels to a plurality of sources that perform access requests to a disk resource includes providing a disk resource queue containing access requests for the disk resource, providing a source queue for each of the sources containing access requests generated by a corresponding one of the sources, determining if a new access request from a particular source is urgent according to a specified number of I/O operations per second for the particular source and a time since a previous access request from the particular source, adding the new access request to the disk resource queue if the new access request is urgent, and adding the new access request the source queue of the particular source if the new access request is not urgent and the length of the disk resource queue is greater than a predetermined queue depth value. A Time to Become Urgent (TBU) value may be provided for each of the sources and TBUi for source Si may correspond to the reciprocal of the specified I/O operations per second for Si. A value CT may correspond to a current time, a value LT may correspond to a time of previous access request for the particular source, and the new access request may be deemed urgent if the difference between CT and LT is greater than TBUi for the particular source. Prior to determining if the new access request is urgent, LT may be adjusted using the formula: $LT=LT-\frac{1}{2}*\max(0, LT-TBUi)$. The predetermined queue depth may be less than a queue depth corresponding to a response time that is less than an average response time specified for each of the sources. Providing quality of service levels to a plurality of sources that perform access requests to a disk resource may also include adding the new access request to the disk resource queue if the length of the disk resource queue is less than the predetermined queue depth value. The predetermined queue depth value may vary according to the specified number of I/O operations per second for each of the sources. Providing quality of service levels to a plurality of sources that perform access requests to a disk resource may also include periodically recalculating the predetermined queue depth value using an actual response time for each of the sources. The period may be one minute. Providing quality of service levels to a plurality of sources that perform access requests to a disk resource may also include reviewing access requests in the source queues and moving an access request to the disk resource queue in response to the access request becoming urgent.

According further to the system described herein, computer software, in a non-transitory computer-readable medium, provides quality of service levels to a plurality of sources performing access requests for a disk resource. The software includes executable code that determines if a new access request from a particular source is urgent according to a specified number of I/O operations per second for the particular source and a time since a previous access request from the particular source, executable code that adds the new access request to a disk resource queue that contains access requests for the disk resource if the new access request is urgent, and executable code that adds the new access request a source queue of the particular source if the new access request is not urgent and the length of the disk resource queue is greater than a predetermined queue depth value, where each of a plurality of source queues contains access requests generated by a corresponding one of the sources. A Time to Become Urgent (TBU) value may be provided for each of the sources and TBUi for source Si may correspond to the reciprocal of the specified I/O operations per second for Si. A value CT may correspond to a current time, a value LT may correspond to a time of previous access request for the particular source, and the new access request may be deemed urgent if the difference between CT and LT is greater than TBUi for the particular source. Prior to determining if the new access request is urgent, LT may be adjusted using the formula: $LT=LT-\frac{1}{2}*\max(0, LT-TBUi)$. The predetermined queue depth may be less than a queue depth corresponding to a response time that is less than an average response time specified for each of the sources. The computer software may also include executable code that adds the new access request to the disk resource queue if the length of the disk resource queue is less than the predetermined queue depth value. The predetermined queue depth value may vary according to the specified number of I/O operations per second for each of the sources. The computer software may also include executable code that periodically recalculates the predetermined queue depth value using an actual response time for each of the sources. The period may be one minute. The computer software may also include executable code that reviews access requests in the source queues and executable code that moves an access request to the disk resource queue in response to the access request becoming urgent.

BRIEF DESCRIPTION OF DRAWINGS

FIG. 11 is a flowchart illustrating steps performed in connection with managing an ordered queue of pending requests for a resource according to the system described herein.

FIG. 12 is a flowchart illustrating a resource providing information used for managing the resource according to the system described herein.

FIG. 13 is a flowchart illustrating steps performed in connection with using different limits for a resource depending upon the urgency of a request according to the system described herein.

DETAILED DESCRIPTION OF VARIOUS EMBODIMENTS

Figure 1:
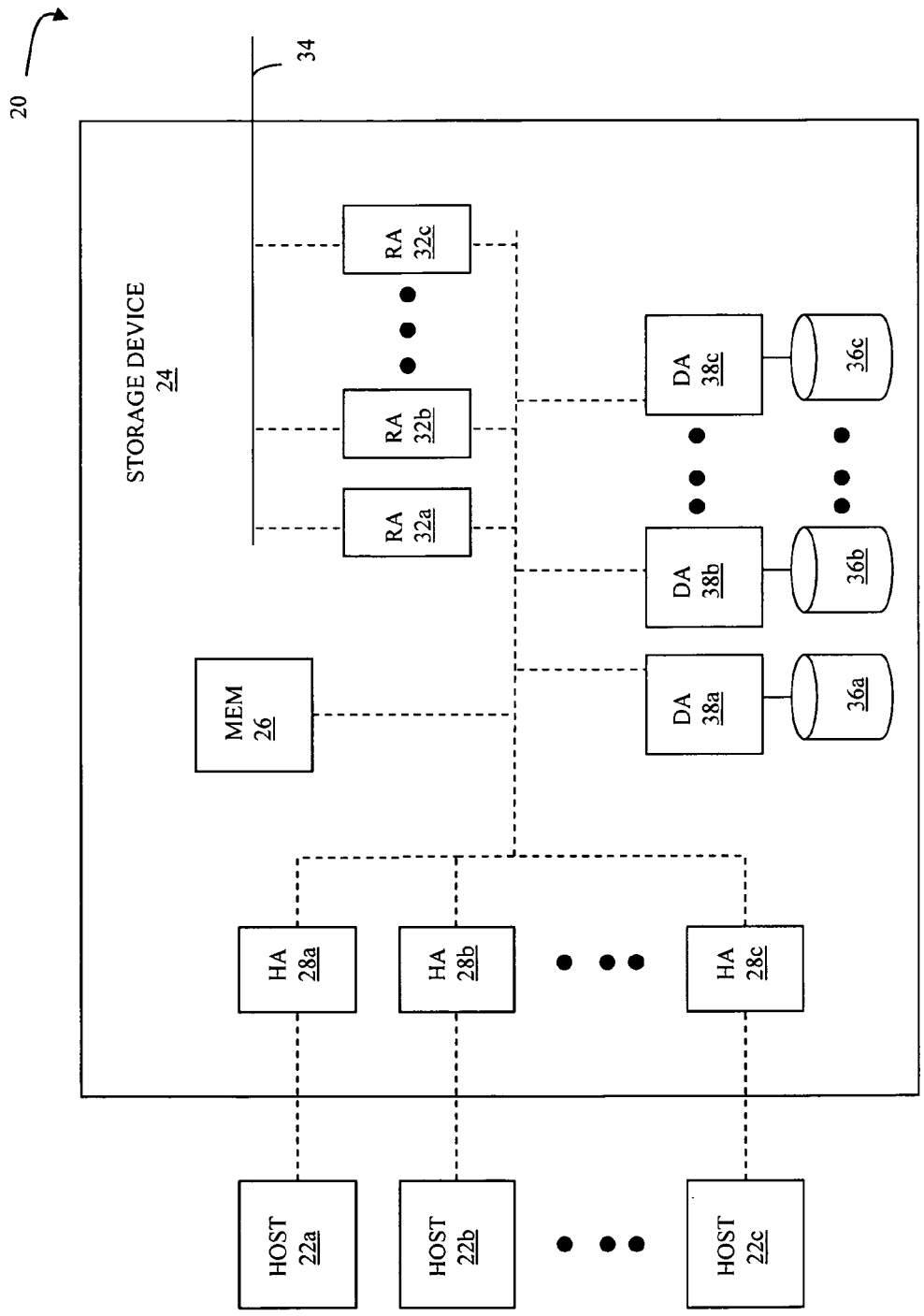
FIG. 1 is a diagram showing a plurality of hosts and a data storage device used in connection with the system described herein.

Referring to FIG. 1, a diagram 20 shows a plurality of hosts 22a-22c coupled to a data storage device 24. The data storage device 24 includes an internal memory 26 that facilitates operation of the storage device 24 as described elsewhere herein. The data storage device also includes a plurality of host adaptors (HA's) 28a-28c that handle reading and writing of data between the hosts 22a-22c and the storage device 24. Although the diagram 20 shows each of the hosts 22a-22c coupled to each of the HA's 28a-28c, it will be appreciated by one of ordinary skill in the art that one or more of the HA's 28a-28c may be coupled to other hosts.

The storage device 24 may include one or more RDF adapter units (RA's) 32a-32c. The RA's 32a-32c are coupled to an RDF link 34 and are similar to the HA's 28a-28c, but are used to transfer data between the storage device 24 and other storage devices (not shown in FIG. 1) that are also coupled to the RDF link 34. The storage device 24 may be coupled to addition RDF links (not shown in FIG. 1) in addition to the RDF link 34.

The storage device 24 may also include one or more disks 36a-36c, each containing a different portion of data stored on the storage device 24. Each of the disks 36a-36c may be coupled to a corresponding one of a plurality of disk adapter units (DA) 38a-38c that provides data to a corresponding one of the disks 36a-36c and receives data from a corresponding one of the disks 36a-36c. Note that, in some embodiments, it is possible for more than one disk to be serviced by a DA and that it is possible for more than one DA to service a disk.

The logical storage space in the storage device 24 that corresponds to the disks 36a-36c may be subdivided into a plurality of volumes or logical devices. The logical devices may or may not correspond to the physical storage space of the disks 36a-36c. Thus, for example, the disk 36a may contain a plurality of logical devices or, alternatively, a single logical device could span both of the disks 36a, 36b. The hosts 22a-22c may be configured to access any combination of logical devices independent of the actual correspondence between the logical devices and the disks 36a-36c.

One or more internal logical data path(s) exist between the DA's 38a-38c, the HA's 28a-28c, the RA's 32a-32c, and the memory 26. In some embodiments, one or more internal busses and/or communication modules may be used. In some embodiments, the memory 26 may be used to facilitate data transferred between the DA's 38a-38c, the HA's 28a-28c and the RA's 32a-32c. The memory 26 may contain tasks or requests that are to be performed by one or more of the DA's 38a-38c, the HA's 28a-28c and the RA's 32a-32c, and a cache for data fetched from or pending write to one or more of the disks 36a-36c. Use of the memory 26 is described in more detail hereinafter.

The storage device 24 may be provided as a stand-alone device coupled to the hosts 22a-22c as shown in FIG. 1 or, alternatively, the storage device 24 may be part of a storage area network (SAN) that includes a plurality of other storage devices as well as routers, network connections, etc. The storage device may be coupled to a SAN fabric and/or be part of a SAN fabric. The system described herein may be implemented using software, hardware, and/or a combination of software and hardware where software may be stored in an appropriate storage medium and executed by one or more processors.

Figure 2:
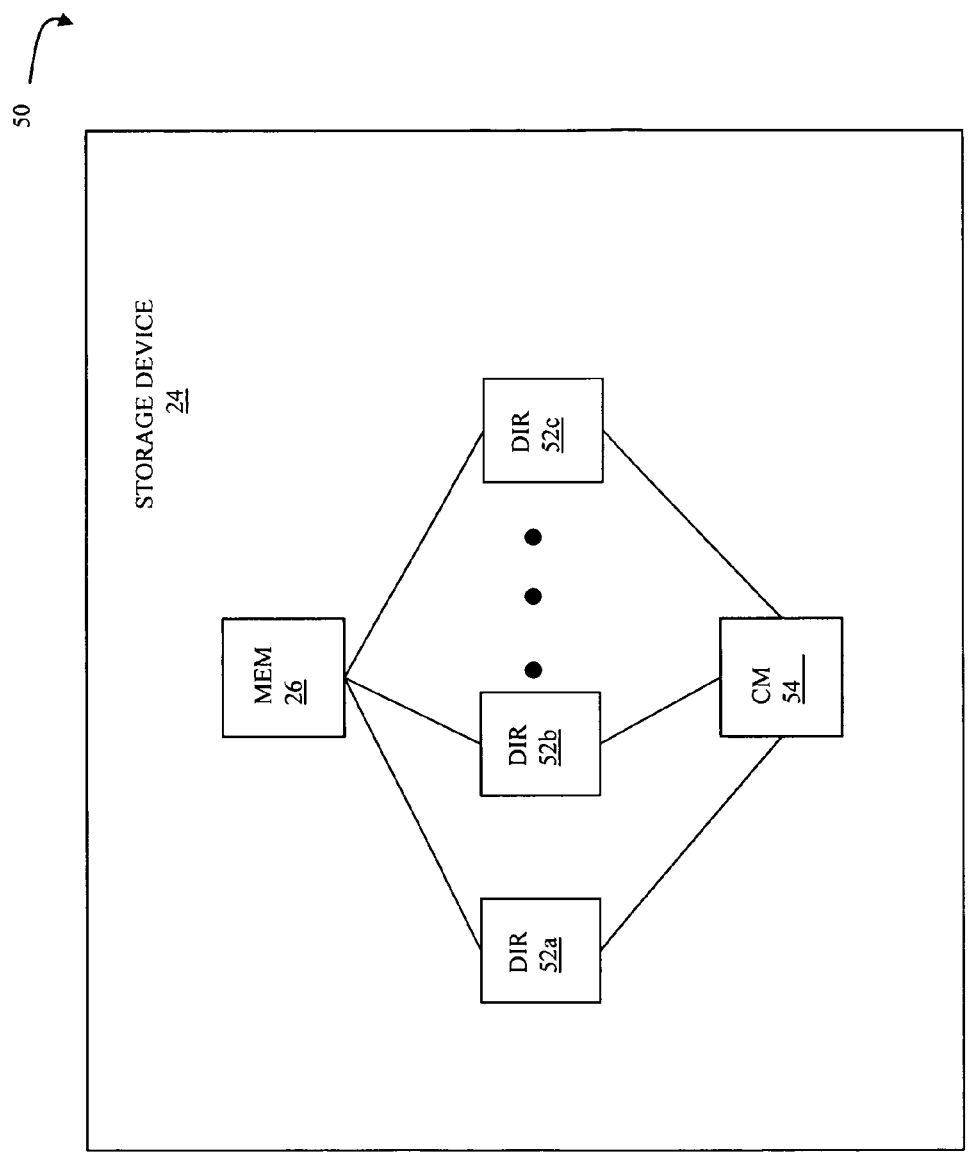
FIG. 2 is a diagram showing a storage device, memory, a plurality of directors, and a communication module according to the system described herein.

Referring to FIG. 2, a diagram 50 illustrates an embodiment of the storage device 24 where each of a plurality of directors 52a-52c are coupled to the memory 26. Each of the directors 52a-52c represents one of the HA's 28a-28c, RA's 32a-32c, or DA's 38a-38c. In an embodiment disclosed herein, there may be up to sixtyfour directors coupled to the memory 26. Of course, for other embodiments, there may be a higher or lower maximum number of directors that may be used.

The diagram 50 also shows an optional communication module (CM) 54 that provides an alternative communication path between the directors 52a-52c. Each of the directors 52a-52c may be coupled to the CM 54 so that any one of the directors 52a-52c may send a message and/or data to any other one of the directors 52a-52c without needing to go through the memory 26. The CM 54 may be implemented using conventional MUX/router technology where a sending one of the directors 52a-52c provides an appropriate address to cause a message and/or data to be received by an intended receiving one of the directors 52a-52c. Some or all of the functionality of the CM 54 may be implemented using one or more of the directors 52a-52c so that, for example, the directors 52a-52c may be interconnected directly with the interconnection functionality being provided on each of the directors 52a-52c. In addition, a sending one of the directors 52a-52c may be able to broadcast a message to all of the other directors 52a-52c at the same time.

In some embodiments, one or more of the directors 52a-52c may have multiple processor systems thereon and thus may be able to perform functions for multiple directors. In some embodiments, at least one of the directors 52a-52c having multiple processor systems thereon may simultaneously perform the functions of at least two different types of directors (e.g., an HA and a DA). Furthermore, in some embodiments, at least one of the directors 52a-52c having multiple processor systems thereon may simultaneously perform the functions of at one types of director and perform other processing with the other processing system. In addition, all or at least part of the global memory 26 may be provided on one or more of the directors 52a-52c and shared with other ones of the directors 52a-52c.

Figure 3:
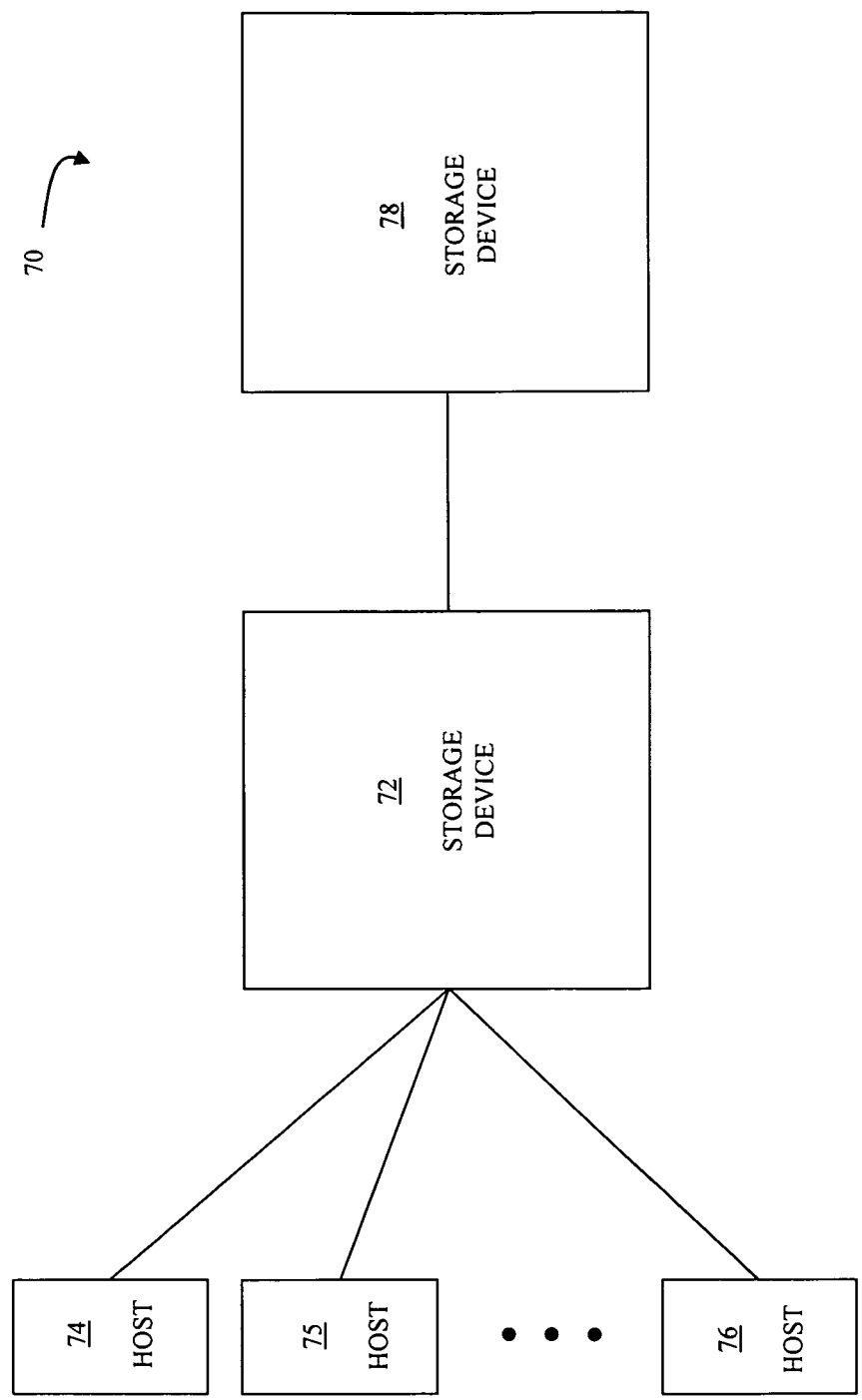
FIG. 3 is a diagram illustrating a plurality of storage devices and a plurality of host devices according to the system described herein.

Referring to FIG. 3, a diagram 70 illustrates a first storage device 72 coupled to a plurality of host devices 74-76. The first storage device 72 is like the storage device 24, described above, and the host devices 74-76 are like the hosts 22a-22c, described above. The first storage device 72 may be coupled to a second storage device 78 by any appropriate means, including a connection through the Internet, a high-speed dedicated connection, a wireless or partially wireless connection, etc. The connection between the storage devices 72, 78 may be like the RDF link 34, discussed above.

In some embodiments, the host devices 74-76 may read and write data only from the first storage device 72, which may then transfer some of the data to the second storage device 78. In other embodiments, one or more of the host devices 74-76 may read and/or write data from and to the second storage device 78 through the first storage device 72.

Figure 4:
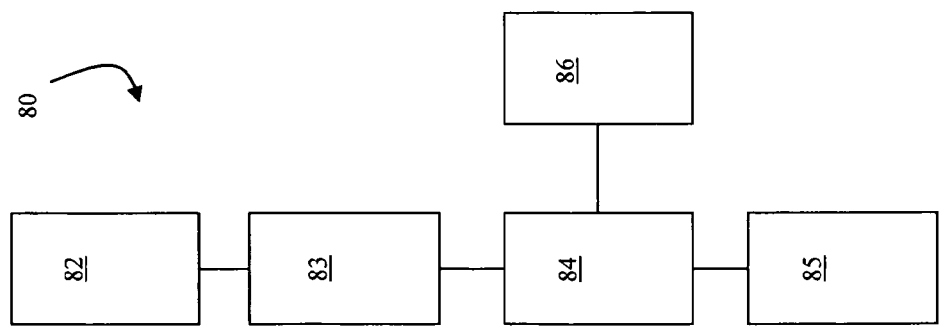
FIG. 4 is a diagram illustrating a plurality of computing devices according to the system described herein.

Referring to FIG. 4, a diagram 80 illustrates a plurality of computing devices 82-86, some or all of which may be like the storage device 24, discussed above. The computing devices 82-86 are interconnected so that, for example, the computing device 82 is coupled to the computing device 83. Note that some of the computing devices 82-86 may be coupled to each other indirectly through other computing devices. For example, the computing device 82 communicates with the computing device 84 through the computing device 83. Thus, a host device coupled to the computing device 82 intending to communicate with the computing device 84 would do so via the computing device 83. One mechanism for facilitating such indirect communication is described in U.S. Pat. No. 6,697,367 titled MULTIHOP SYSTEM CALLS, which is incorporated by reference herein.

In the different scenarios illustrated by the diagram 70 of FIG. 3 and the diagram 80 a FIG. 4, one or more computing devices provides a service request to one or more other computing devices. In some cases, a host device is providing a request to a storage device. In other cases, a first storage device is providing a request to a second storage device. Note also that the internal components of the storage device 24 or other computing devices may also provide requests that are internal thereto so that, for example, the HA 28a of the storage device 24 of FIG. 1 may provide a request to one of the DA's 38a-38c of the storage device 24.

Figure 5:
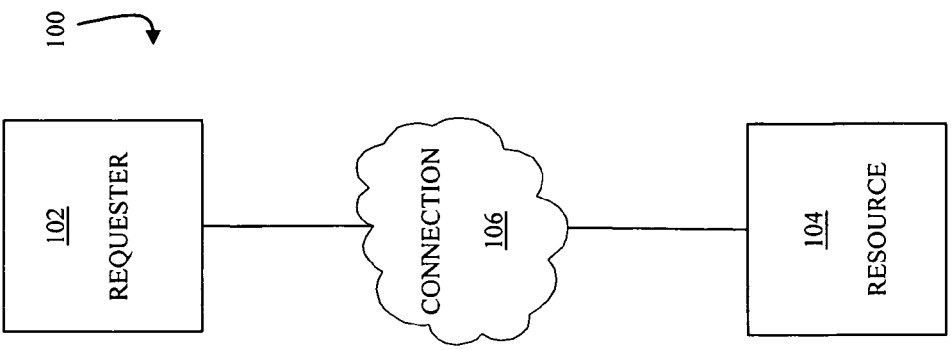
FIG. 5 is a diagram illustrating a requester and a resource according to the system described herein.

Referring to FIG. 5, a diagram 100 illustrates a requester 102 that provides requests to a resource 104 that services the requests. The requester 102 may be any device or component that may provide requests to the resource 104. For example, the requester 102 may be a host device, a requesting component internal to the storage device 24, or any other requesting component or device. Similarly, the resource 104 represents any device or component capable of servicing the request provided by the requester 102. For example, the resource 104 may represent a storage device servicing requests from a host device or from another storage device. The requests may be I/O requests.

Note that the resource 104 may be managed by another component or device separate from the resource. For example, the resource 104 may represent the memory 26 of the storage device 24, which is managed by other processes within the storage device 24 so that a request for memory by the requester 102 is not handled directly by the memory 26 itself. For the discussion herein, references to the resource 104 (and possibly references to other, similar, resources) should be understood to include both devices and components that service requests as well as devices or components that manage the resource 104 but are external to the resource 104.

The diagram 100 also includes a connection 106 for facilitating communication between the requester 102 and the resource 104. The connection 106 may be any medium or mechanism used to communicate the request from the requester 102 to the resource 104 and/or used to provide results from the resource 104 to the requester 102. The connection 106 may be, for example, any communication network, a direct connection, the Internet, an internal data bus of the storage device 24, an ESCON or Fibre Channel connection, etc.

Figure 6:
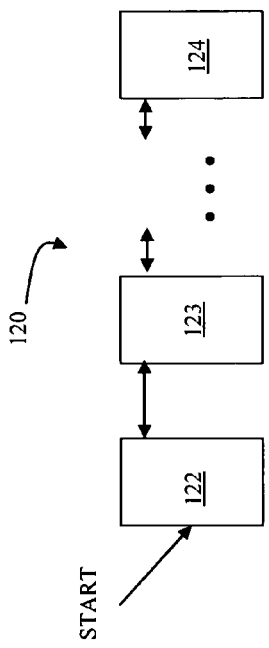
FIG. 6 is a diagram illustrating an ordered queue of pending requests according to the system described herein.

Referring to FIG. 6, a queue 120 may be maintained by the resource 104 or by an entity that controls the resource 104 to provide an ordered list of pending requests. In an embodiment herein, there is a single queue for each resource, although, as described in more detail elsewhere herein, it is also possible to have multiple queues for each resource. The queue 120 may be implemented as a doubly linked list of elements 122-124 where each of the elements 122-124 represents a pending request (job) to be serviced using the resource 104. Other appropriate ordering schema may be used, such as a heap.

The queue 120 includes a start pointer that points to the first element 122 of the queue 120. In an embodiment herein, when it is time to service a next request, the request corresponding to the first element 122 is serviced. Of course, other orderings/conventions are also possible. After servicing the request, the first element 122 may be removed from the queue 120 and the start pointer may be adjusted to point to the next element 123. Note that the details of servicing of the request depend on the type and nature of the resource as well as the type and nature of other related elements that handle servicing of the requests using the resource.

Note that any other appropriate data structure and/or mechanism may be used to maintain and manage ordering of pending requests. As explained in more detail elsewhere herein, it may be necessary in some instances to be able to insert elements in the middle of the ordered list of pending requests. Accordingly, solutions that employ arrays and/or tables that require moving a number of elements to perform such insertions may not be ideal.

Figure 7:
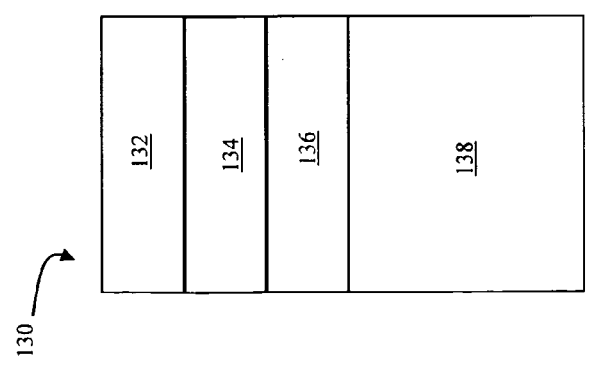
FIG. 7 illustrates data used in connection with a pending request according to the system described herein.

Referring to FIG. 7, a diagram 130 shows one of the elements 122-124 of the queue 120 of FIG. 6 in more detail. The element includes a first pointer field 132 and a second pointer field 134. The first pointer field 132 contains a pointer to a previous element of the queue 120 while the second pointer field 134 contains a pointer to the next element of the queue 120. In an embodiment herein, the first pointer field 132 contains a pointer to null for the first element 122 of the queue 120 and the second pointer field 134 contains a pointer to null for the last element 124 of the queue 120.

The diagram 130 also shows the element containing a time to become urgent (TBU) field 136 and a request description field 138. The TBU field 136 is used to determine ordering for the elements 122-124 of the queue 120 and is discussed in more detail elsewhere herein. The request description field 138 contains a description of the request provided by the requester 102 for the resource 104. The request description field 138 may be provided in any appropriate format or protocol (including any conventional format or protocol) agreed upon by the requester 102 and the resource 104. The resource 104 uses the request description field 138 to fulfill the request.

The TBU that is associated with each of the elements 122-124 is provided by the requester 102 (or an agent associated with the requester 102) to indicate a specific time at which the request becomes an urgent request. Once a request has become urgent, the request may be given a higher priority by the resource 104. As described in more detail elsewhere herein, in instances where multiple requests for the same resource have all become urgent, the requests may be fulfilled in an order corresponding to the most urgent first, the second most urgent second, etc. according to the value of the TBU parameter. Thus, the TBU parameter may be used as a mechanism to compare the relative urgency of requests.

In an embodiment herein, the value for the TBU parameter may be provided in units of absolute time (wall clock time) so that the TBU parameter indicates a specific time at which the associated request becomes urgent. Of course, in instances where the requester 102 is providing the TBU parameter, it is helpful if the requester 102 and the resource 104 are synchronized to the same wall clock time. However in a distributed system maintaining an accurate clock may be difficult and hence it is possible for the requester 102 to provide a relative time (e.g., relative to current time) which may be then translated by the resource 104 into absolute time or at least into the same type of time parameter used by the resource 104. Providing such a relative time may not take into account an amount of time it takes for the request to travel from the requester 102 to the resource 104. This travel time may be insignificant compared with the average response time of an I/O on a storage subsystem, but when the travel time is not is not insignificant, an adjustment that take into account the travel time can be made. For example, it is possible to add an empirically determined constant corresponding to an average time to send a request. Note also that the requester 102 may specify the TBU in other units, such as I/O cycles. Any appropriate units for TBU may be used provided that the units are understood by both the requester 102 and the resource 104 and/or may be converted to units understood by both the requester 102 and the resource 104.

Figure 8:
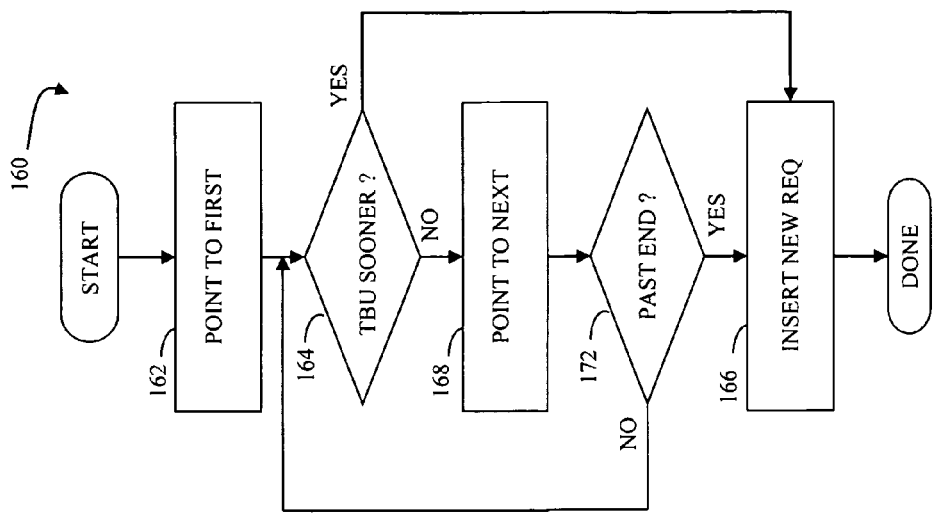
FIG. 8 is a flowchart illustrating adding a pending request to an ordered queue of pending requests according to the system described herein.

Referring to FIG. 8, a flowchart 160 illustrates steps performed by a resource in connection with receiving a request from a requester. Processing begins at a first step 162 where a pointer used to iterate through the queue of pending requests is made to point to the first element (most urgent) of the queue. Following the step 162 is a test step 164 which determines if the value for the TBU of the request being inserted is sooner (more urgent) than the TBU of the element pointed to by the pointer used to iterate through the queue. If so, then control transfers from the test step 164 to a step 166 where the request being added is inserted in the queue of pending requests at the location pointed to by the pointer. Following the step 166, processing is complete.

If it is determined that the test step 164 that the value for the TBU of the request being inserted is not sooner (more urgent) than the TBU of the element pointed to by the pointer, then control transfers from the test step 164 to a step 168 where the pointer is incremented to point to the next element of the queue. Following the step 168 is a test step 172 which determines if the pointer points past the end of the queue (i.e., if the entire queue has been traversed). If so, then control transfers from the test step 172 to the step 166, discussed above, where the request is inserted. Note that if the step 166 is reached from the step 172, then the new request is being inserted at the end of the queue. Following the step 166, processing is complete.

Of course, if the queue of pending requests is initially empty, then the processing illustrated by the flow chart 160 may be avoided. In such a case, the start pointer for the queue would be adjusted to point to the new request.

In an embodiment herein, a single queue may be used by the resource 104. However, in other embodiments, it may be possible to use two separate queues: a first queue for requests that have passed the time to become urgent (urgent requests) and a second queue for all other requests (non-urgent requests). In such an embodiment, it may be possible to provide special processing that moves requests from the queue of non-urgent requests to the queue of urgent requests after the time to become urgent has passed for the moved requests.

For embodiments that use an urgent request queue and a non-urgent request queue, it is possible to provide different or special processing for the queues. For example, it is possible to process some number of urgent requests for each non-urgent request that is processed so that in any given amount of time, more urgent requests than non-urgent requests are processed. Of course, in such a situation, non-urgent requests could be processed exclusively whenever the queue for urgent requests is empty. Other mechanisms may be used to provide different processing for requests in the urgent queue and requests in the non-urgent queue.

Figure 9:
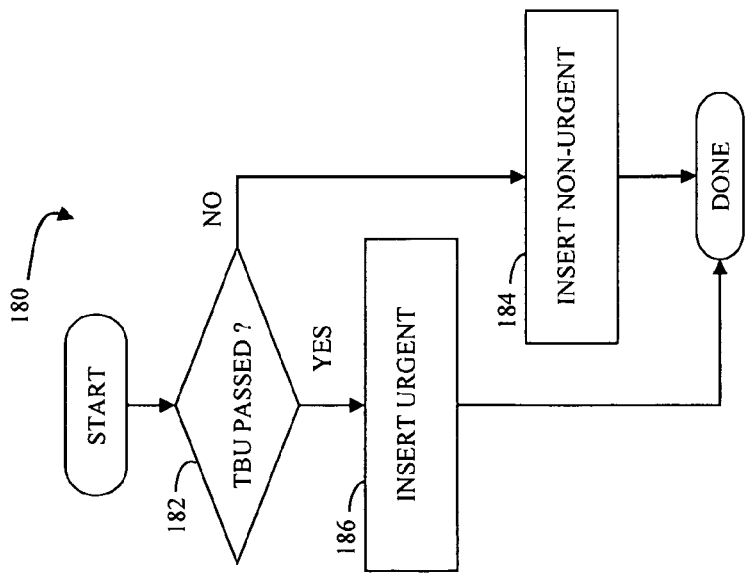
FIG. 9 is a flowchart illustrating adding a pending request to one of two ordered queues depending upon the urgency of the request according to the system described herein.

Referring to FIG. 9, a flowchart 180 illustrate steps performed in connection with determining whether to place a new request in an urgent queue or in a non-urgent queue. Processing begins at a first test step 182 where it is determined if the TBU associated with the new request has passed. If not, then control transfers to the step 184 where the new request is inserted into the non-urgent queue in a manner similar to that described above in connection with the flowchart 160 of FIG. 8. Following step 184, processing is complete.

If it is determined at the test step 182 that the TBU value associated with the new request has passed, then control transfers from the test step 182 to a step 186 where the request is inserted into the urgent queue in a mariner similar to that discussed above in connection with the flowchart 160 of FIG. 8. Following step 186, processing is complete.

Figure 10:
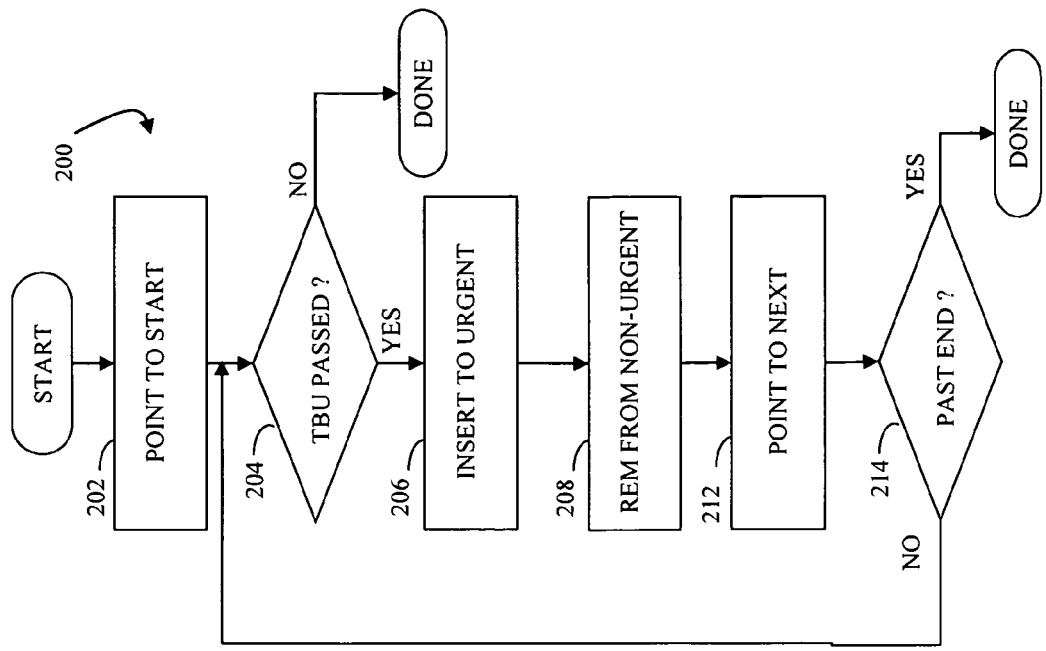
FIG. 10 is a flowchart illustrating periodically moving pending requests from an ordered queue of non-urgent requests to an ordered queue of urgent requests according to the system described herein.

Referring to FIG. 10, a flowchart 200 illustrates steps performed periodically to determine if a request in a non-urgent queue should be moved to an urgent queue. Note that this may occur as time passes since a request that was non-urgent when first placed in the non-urgent queue (see the flowchart 180 and the corresponding discussion above) may become urgent when the current time (wall time) corresponds to the TBU value associated with the request.

Processing begins at a first step 202 where a pointer is set to point to the start of the queue used for non-urgent requests. The pointer set at the step 202 may be used to iterate through the requests in the non-urgent queue of requests. Following the step 202 is a test at 204 where it is determined if the TBU for the request pointed to by the pointer has passed. If not, then processing is complete. Note that since the queue is ordered according to TBU values, then if the TBU has not passed for a particular element of the queue, the TBU has not passed for any additional elements beyond the particular element.

If it is determined at the test step 204 that the TBU for an element pointed to by the pointer has passed, then control transfers from the test step 204 to a step 206 where the element that is pointed to by the pointer is inserted into the urgent queue in a manner similar to that discussed above in connection with the flowchart 160 of FIG. 8. Following the step 206 is a step 208 where the element is removed from the non-urgent queue. Note that removing the element at the step 208 may be performed using any appropriate technique, including conventional techniques used in connection with doubly linked lists and/or heaps. Following the step 208 is a step 212 where the pointer used to iterate through the non-urgent queue is incremented. Following the step 212 is a test step 214 where is determine if the pointer points past the end of the non-urgent queue (points to null). If so, then processing is complete. Otherwise, control transfers from the test step 214 back to the step 204, discussed above.

In some embodiments, resources and/or entities that manage resources may not have a mechanism for handling an ordered list of requests. When this occurs, it may be useful for any requesters that provide requests that use such resources to have a mechanism for providing requests for such resources in an appropriate fashion. Generally, it is possible to have a policy that differentiates between requests that have become urgent for service and requests that have not become urgent for service to give priority to requests that have become urgent. It may be possible to have a global variable indicating the total number of pending requests (and/or pending request that have become urgent) for a resource. Requesters would examine the global variable and not provide requests and/or not provide non-urgent requests for the resource unless the global variable was below a predetermined threshold.

When a request is sent to a resource that has no reordering ability e.g. hard disk or network, a limit on the number of non-urgent requests may be enforced to ensure that urgent requests that arrive in the system latter will have a good response time from the resource. On other types of resources such as the memory 26, a limit on the utilization can be enforced. For example, it is possible to have a policy where a non-urgent request can not use space in the memory 26 if more than 50% of the memory is already in use, while an urgent request can allocate space in the memory 26 until the memory reaches the 75% mark (up to 75% in use).

In some embodiments, it is possible to keep polling a list of requests from the beginning until there is a request that can be executed. Another possibility for managing a resource is to move requests that require a resource which is not available (due to the policy) from a main queue and to a separate internal queue (waiting for the resource). When either the resource status changes, e.g. the resource completes a request, or when the TBU arrives for the request moved to the internal queue, the request is moved back to the main queue. In either case, when a resource that can not re-order requests according to the TBU is a bottleneck, the queue of non-urgent requests is limited and therefore the impact on the response time of urgent requests is bounded.

Referring to FIG. 11, a flowchart 220 illustrates steps performed by a requester in connection with determining whether to provide a request for a resource in a situation where the resource does not maintain an ordered list of pending requests. Processing begins at a first test step 222 where it is determined if the global variable used to monitor the requests provided to the resource is above a predetermined limit. If so, then processing transfers back to the step 222 to continue to poll the global variable until it is not below the predetermined limit. The processing illustrated by the flowchart 220 may be performed in connection with every new request or, alternatively, may be performed in connection with non-urgent requests only.

In some embodiments, the global variable may represent the total number of pending requests already provided to the resource. In other embodiments, the global variable may represent the total number of pending urgent requests provided to the resource. Note, however, that urgency may be determined at the time a request is provided to the resource and that, as discussed elsewhere herein, a pending request that is initially non-urgent may become urgent after enough time has passed.

If it is determined at the test step 222 that the global variable is not greater than the predetermined limit, then control passes from the test step 222 to a step 224 where the request is made for the resource. Following the step 224, processing is complete. In some embodiments, the global variable may be incremented at the step 224 by the requester to reflect that a new request has been added. In other embodiments, the resource and/or an entity that manages the resource may increment the global variable.

In instances where the global variable represents a number of non-urgent requests, it is possible to continue searching for serviceable requests if it is determined at the step 222 that a particular request is non-urgent and the global variable exceeds the limit. In such a case, additional processing may traverse a list of pending requests searching for an urgent request that may be provided to the resource immediately even though a non-urgent may not.

Referring to FIG. 12, a flowchart 230 illustrates steps performed in connection with managing the global variable used in connection with providing requests for resource. It is possible for the resource and/or an entity that manages the resource to decrement the global verbal counter each time a request is satisfied. However, it is also possible for a separate process or entity, such as a requester, to manage the global variable.

Processing for FIG. 12 begins at a first test step 232 which polls to wait for a signal from the resource (or related entity) indicating that a request (or an urgent request) has been serviced. Once it is determined at the test step 232 that a request has been serviced in connection with the resource, control transfers from the test step 232 to a step 234 where the global variable is decremented. Following the step 234, control transfers back to the test step 232.

As mentioned elsewhere herein, a resource may be a component, a device or, a portion thereof. For example, a finite cache memory may be a resource. In some cases, use of a resource like the cache memory may be conditioned on the type of request (urgent or non-urgent) that requests the resource. For example, a cache slot may be provided in connection with an urgent request if the cache memory is 80% full or less but may be provided in connection with a non-urgent request only if the cache memory is 60% full or less. In such a case, when the cache memory is between 60% and 80% full, the granting of a cache slot to a request is conditioned upon whether the request is an urgent requests or a non-urgent request.

Referring to FIG. 13, a flowchart 250 illustrates conditioning granting of a resource on the state of urgency of a request. Processing begins at a first test step 252 where is determined if the request is urgent. If not, then control transfers from the test step 252 to a step 254 where a limit of N is used to determine whether the request can be satisfied or not. Following the step 254, processing is complete.

If it is determined at the test step 252 that the request is urgent, then control transfers from the test step 252 to a step 256 were a limit of M is used to determine whether to grant the request. Following the step 256, processing is complete. The values of M and N may be different and maybe set such that an urgent request is more likely to be fulfilled or will be satisfied faster than a non-urgent request.

In some instances, it is desirable to provide a particular quality of services to different applications that access a resource such as a disk. The quality of service may be expressed in terms of I/O operations per second (IOSPS) and/or in an average response time (RT) corresponding to the time between an application initiating a disk write and the application receiving an acknowledgement. Thus, a particular application (or group of applications, user(s), sites, etc.) may indicate (e.g., via a service level agreement or similar) that the application expects to perform a certain number of IOSPS and/or expects a certain RT. The system described herein facilitates providing a specified (expected/desired) level of service.

Figure 14:
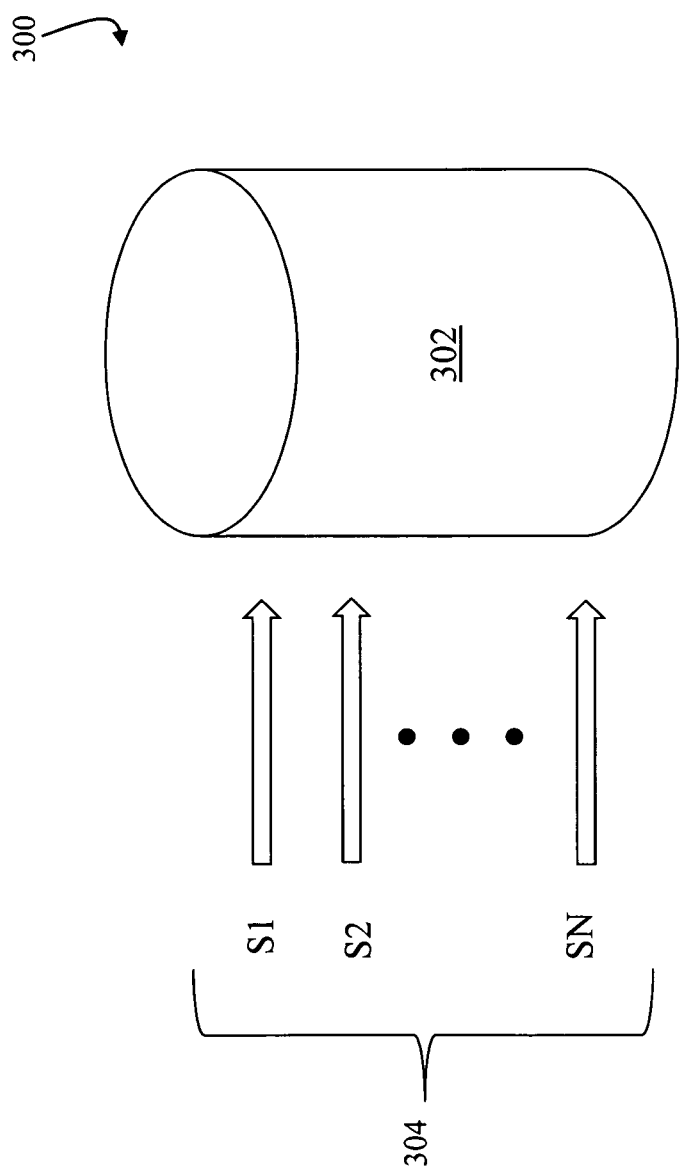
FIG. 14 is a diagram illustrating a disk resource being accessed by a number of sources according to an embodiment of the system described herein.

Referring to FIG. 14, a diagram 300 shows a disk resource 302 and a plurality of sources 304 that request service (e.g. I/O's) from the disk resource 302. Each of the sources 304 may correspond to an application, a group of applications, a user, a group of users, an organization, etc. that accesses the disk resource 302 and that may have an expected quality of service. Note that, although only three sources are shown in the diagram 300, the sources 304 are meant to represent any number of sources, N. The system described herein is designed to provide, as nearly as possible, the expected quality of services associated to each of the sources 304.

Figure 15:
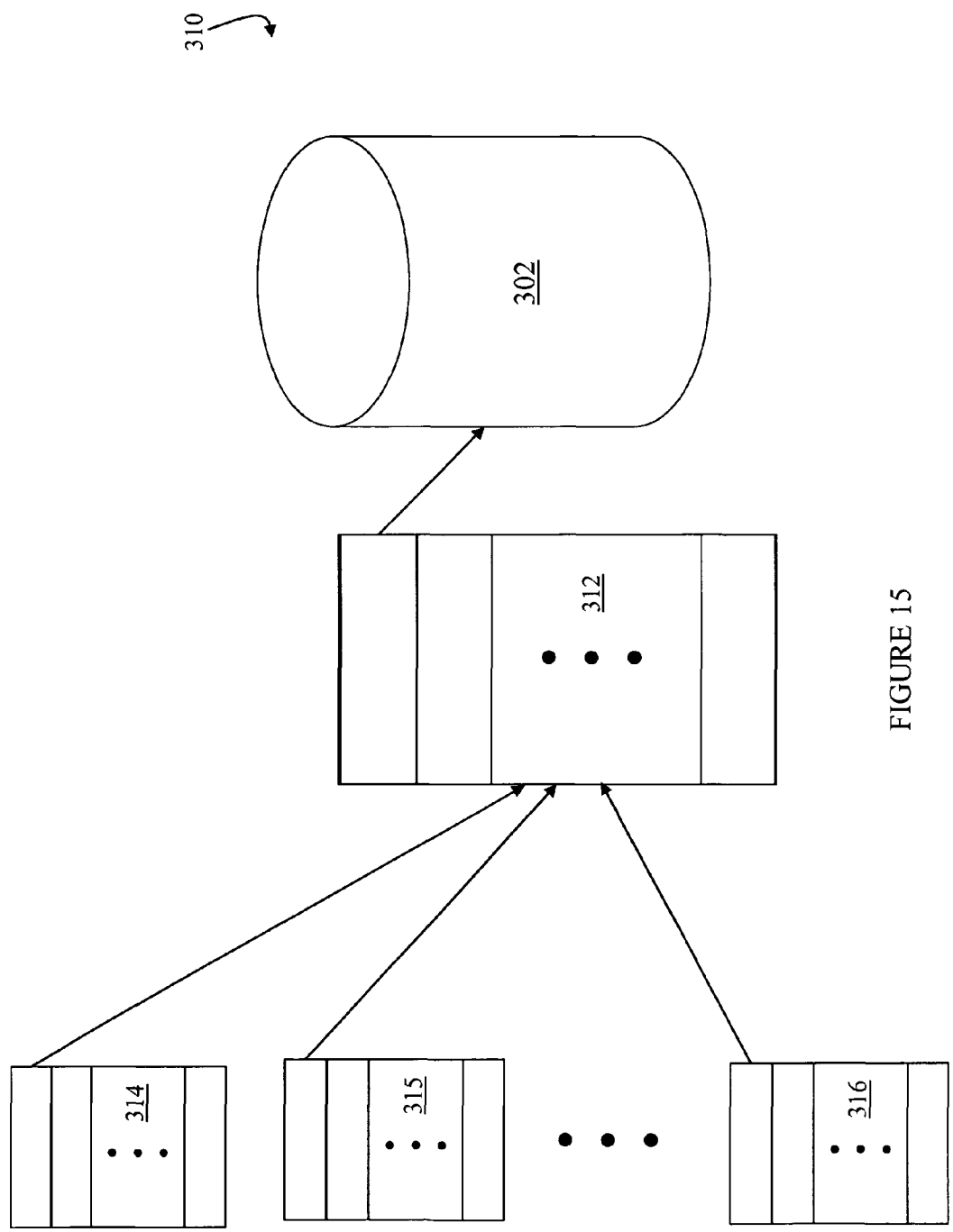
FIG. 15 is a diagram illustrating a disk resource with a resource queue and a number of source queues according to an embodiment of the system described herein.

Referring to FIG. 15, a diagram 310 shows the disk resource 302 being accessed using a resource queue 312. Each of the service requests (i.e., I/O operations) are first placed on the resource queue 312 and then removed, one at a time, to be serviced by the disk resource 302. The number of items on the resource queue 312 is called the "queue depth". Use of the queue depth of the resource queue 312 is described in more detail elsewhere herein.

The diagram 310 also shows a plurality of source queues 314-316, each of which corresponds to one of the sources 304 so that, for example, the source queue 314 may correspond to a source S1, the source queue 315 may correspond to a different source S2, etc. Each of the source queues 314-316 may contain pending service requests (I/O operations) for a corresponding one of the sources. As described in more detail elsewhere herein, a service request from a source may be provided directly to the resource queue 312 or may first be provided to a corresponding one of the source queues 314-316. Under certain conditions, service requests may be moved from the source queues 314-316 to the resource queue 312. Note that the queues 312, 314-316 may be provided using any appropriate mechanism/data structure, including, without limitation, an array, a linked list, etc.

Figure 16:
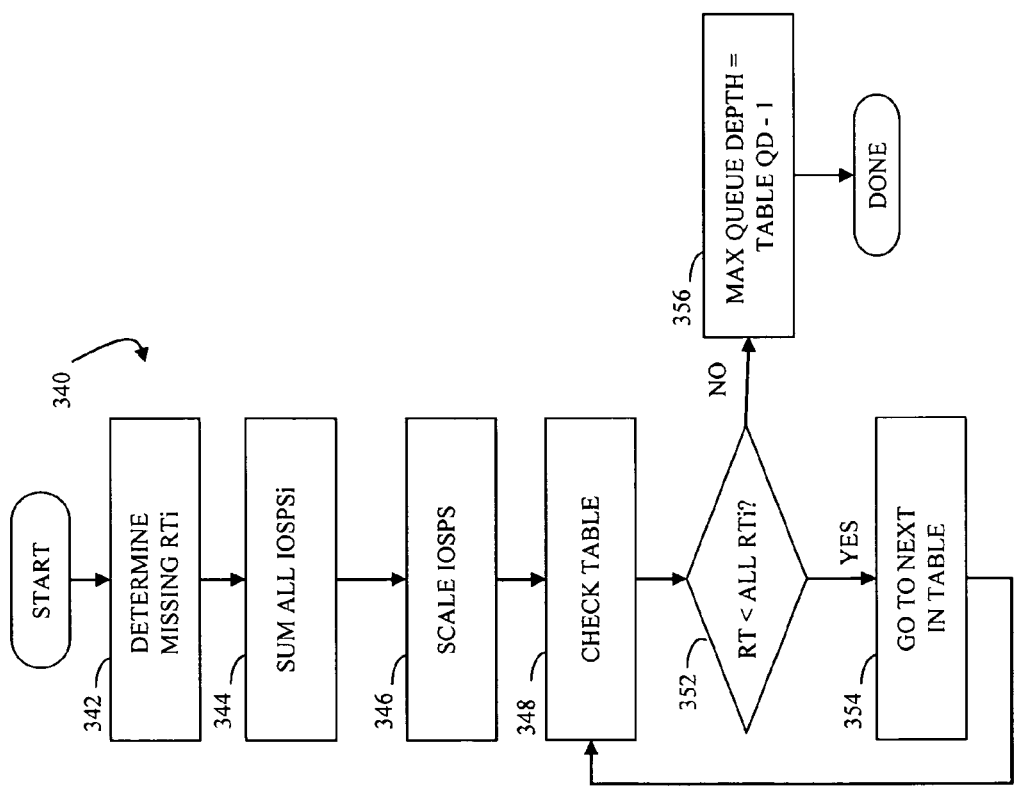
FIG. 16 is a flow chart illustrating processing performed in connection with initial calculation of a maximum queue depth according to an embodiment of the system described herein.

Referring to FIG. 16, a flow chart 340 illustrates steps performed in connection with determining a max queue depth value. As discussed in more detail elsewhere herein, the max queue depth value may be used to determine whether to place service requests on the resource queue 312 or one of the source queues 314-316 and when to move service requests from one of the source queues 314-316 to the resource queue 312. Processing begins at a step 342 where missing values for RTi are determined. For each source Si, the specified IOSPSi value is provided while RTi may or may not be provided. At the step 342, RTi is determined for sources Si in which only IOSPSi has been provided. In an embodiment herein, an RTi that is not otherwise provided may be calculated using the formula: $RTi=1/IOSPSi$. Of course, a different appropriate technique for calculating RTi may be used instead.

Following the step 342 is a step 344 where all of the IOSPSi values for all of the sources for the disk resource are added together to provide a value for IOSPS, the total of all of the requested I/O's per second from all the sources 304 that access the disk resource 302. Following the step 344 is a step 346 where IOSPS is scaled to increase the likelihood that all of the sources will receive the requested IOSPSi and/or RTi. In an embodiment herein, the value of IOSPS determined at the step 344 is multiplied by 1.6 at the step 346, but other scaling factors may be used instead, including possibly scaling factors less than one.

Following the step 346 is a step 348 where a table is consulted to find a queue depth and response time (RT) corresponding to the value of IOSPS determined at the steps 344, 346. In an embodiment herein, a table is used that provides a plurality of entries that, for each queue depth of the resource queue 312 from one to sixty-four, indicate the corresponding IOSPS and RT. Note that, generally, as the queue depth increases, the corresponding values of IOSPS and RT also increase. Note also that it is possible to derive the table used at the step 348 using, for example, techniques taught in U.S. patent application Ser. No. 12/924,361, filed on Sep. 24, 2010 and titled: TECHNIQUES FOR MODELING DISK PERFORMANCE, which is incorporated by reference herein. Of course, other techniques may be used to provide the table used at the step 348.

Following the step 348 is a test step 352 where it is determined if the value of RT, determined at the step 348 using the table, is less than all values of RTi for all the sources 304 for the disk resource. That is, given the particular queue depth from the table, can all sources expect a response time less than the specified response time. If so, then control transfers from the test step 352 to a step 354 where the next entry in the table is examined. Each subsequent entry in the table corresponds to a queue depth one more than a previous entry. In the system described herein, it is desirable to determine the largest queue depth that still provides a specified response time RTi for all sources.

Following the step 354, control transfers back to the step 348, discussed above, where the value of RT is obtained for the entry in the table being examined. The value of RT obtained at a second iteration corresponding to a queue depth of M is likely greater than a value of RT obtained in a first iteration corresponding to a queue depth of M−1. Following the step 348 is the test step 352 where it is determined if the new RT is still less than all RTi values. If not, then control transfers from the test step 352 to a step 356 where the maximum queue depth variable is set to the table queue depth entry minus one. Thus, the maximum queue depth corresponds to a queue depth for the resource queue 312 that provides a response time for all sources that is less than the specified response time, RTi.

Figure 17:
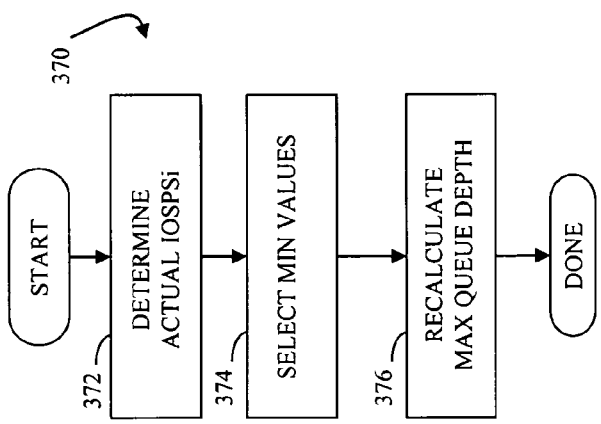
FIG. 17 is a flow chart illustrating processing performed in connection with subsequent calculations of maximum queue depth according to an embodiment of the system described herein.

Referring to FIG. 17, a flow chart 370 illustrates processing that is performed periodically to adjust the value of max queue depth based on actual observed (measured) rates. In an embodiment herein, the period of recalculation could be one minute, but other recalculation periods are also possible. In other embodiments, it is possible to never adjust the value of max queue depth and, instead, always use the value that is initially calculated.

Processing for the flow chart 370 begins at a first step 372 where the actual I/O's per second (iospsi) for source Si is determined. One way to determine iospsi is to divide the observed qi (the queue depth provided by service requests from Si) by RTi, the expected response time.

Following the step 372 is a step 374 where IOSPSi (specified I/O's per second) and iospsi (observed I/O's per second) are compared and the new value for IOSPSi is the minimum of the two. That is, IOSPSi=min(IOSPSi, iospsi). Note that the steps 372, 374 may be repeated for all of the sources 304, Si. Following the step 374 is a step 376 where the max queue depth is recalculated using, for example, the processing illustrated by the flow chart 340, discussed above. After the step 376, processing is complete.

Figure 18:
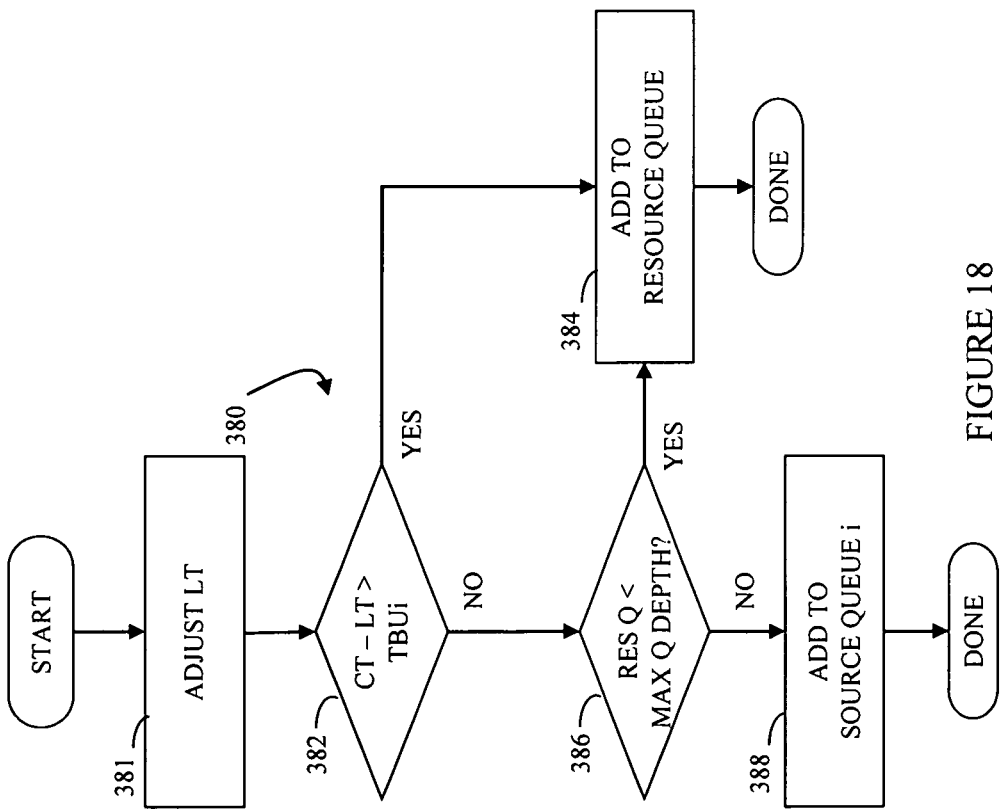
FIG. 18 is a flow chart illustrating processing performed in connection with placement of service requests on different queues according to an embodiment of the system described herein.

Referring to FIG. 18, a flow chart 380 illustrates steps performed in connection with one of the sources, Si, generating a new request (I/O operation). Processing begins at a first step 381 where a value for LT (corresponding to the last time an I/O operation had been performed/requested for the source Si) is adjusted. If a significant amount of time has passed since a previous I/O operation, then the next I/O operation should be more likely to be deemed urgent (i.e., should become urgent sooner). For example, if a particular source has a TBU of 50 ms, and 100 ms has passed since a previous I/O operation, then the source has essentially missed an opportunity to perform an I/O operation. Accordingly, it would be desirable to cause the next I/O request to become urgent sooner. In an embodiment herein, this may be accomplished by adjusting (reducing) the last time (LT) value at the step 381 so that the next I/O operation is more likely to be deemed urgent. In an embodiment herein, LT is adjusted at the step 381 according to the formula:

$$LT=LT-\tfrac{1}{2}*\max(0,LT-TBUi)$$

Note, by the way, that if LT−TBUi is less than zero (i.e., the last I/O operation was relatively recent), then LT is not adjusted.

Following the step 381 is a step 382 where it is determined if the time since the last I/O operation for the source corresponds to a time to become urgent (TBUi) for the source Si. In an embodiment herein, TBUi equals 1/IOSPSi, although other mechanisms may be used to determine/set TBUi. At the step 382, the difference between the current time (CT) and the last time an I/O operation was performed (LT) is compared to TBUi. If (CT−LT) is greater than TBUi (significant time has passed since the previous I/O operation), then control passes from the test step 382 to a step 384 where the service request (I/O operation) is placed directly onto the resource queue 312. Following the step 384, processing is complete.

If it is determined at the test step 382 that (CT−LT) is not greater than TBUi, then control passes from the test step 382 to a test step 386 where it is determined if the length of the resource queue 312 is less than the maximum queue depth (determined as set forth above). If so, then control transfers from the test step 386 to the step 384, discussed above, where the service request (I/O operation) is added to the resource queue 312. Otherwise, control transfers from the test step 386 to a step 388 where the service request (I/O operation) is added to the source queue i for the source Si. Following the step 388, processing is complete.

In an embodiment herein, the actual depth of the resource queue 312 may be determined by subtracting the number of items that have been serviced from the number of items that have been provided to the queue 312. Other appropriate techniques may be used instead to determine the depth of the resource queue 312. Note also that, in some cases, it is possible to add items to the resource queue 312 but otherwise it may not be possible to control when or in what order items are ultimately serviced.

Figure 19:
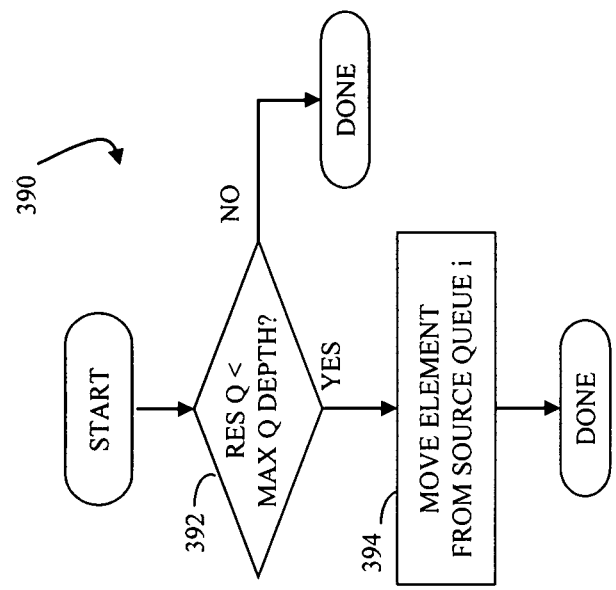
FIG. 19 is a flow chart illustrating processing performed in connection with moving service requests to a resource queue after the resource queue decreases in size according to an embodiment of the system described herein.

Referring to FIG. 19, a flow chart 390 illustrates processing performed in response to the size of the resource queue 312 decreasing after a service request (I/O operation) is completed by the disk resource 302. Processing begins at a test step 392 where it is determined if the length of the resource queue 312 is less than max queue depth. If not, then processing is complete. Otherwise, control transfers from the test step 392 to a step 394 where an element from a source queue is moved from the source queue to the resource queue 312. Following the step 394, processing is complete. Note, however, that it could also be possible to transfer from the step 394 back to the step 392 and keep performing the loop containing the steps 392, 394 until the test at the step 392 indicates that the resource queue 312 is not less than max queue depth. Also, in some embodiments, it is possible to examine the source queues 314-316 in a particular order, such as an order based on priority or an order based on the age of the oldest entry in each.

Figure 20:
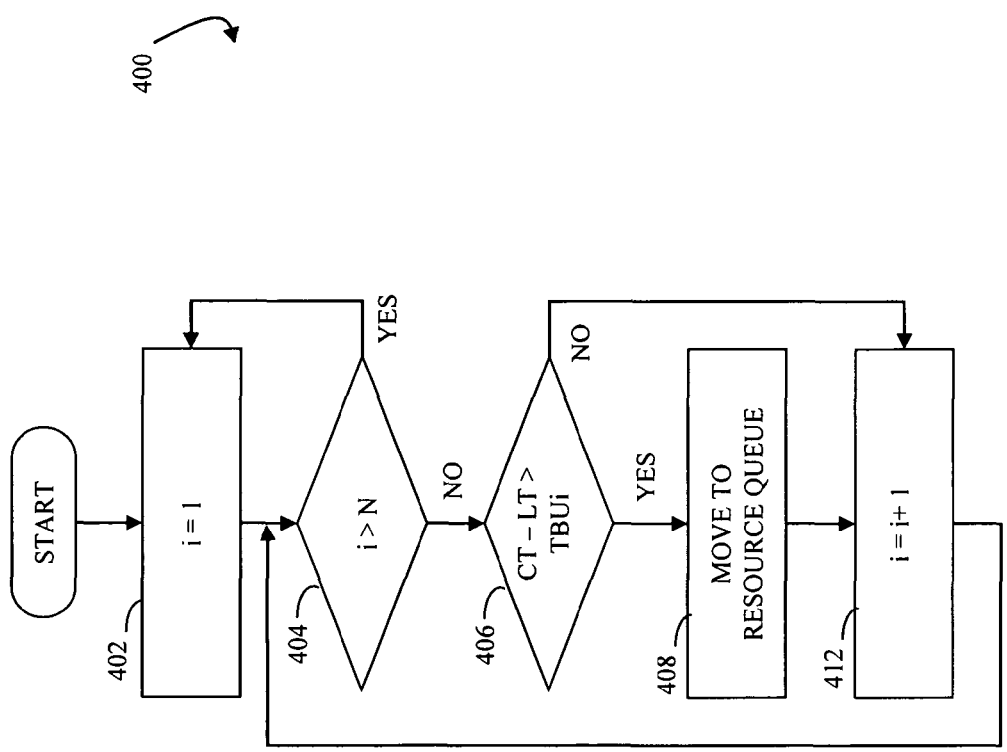
FIG. 20 is a flow chart illustrating processing performed in connection with moving service requests to a resource queue after the requests become urgent according to an embodiment of the system described herein.

Referring to FIG. 20, a flow chart 400 illustrates steps performed periodically (e.g., once per millisecond) in connection with determining if any elements/entries on the source queues 314-316 have become urgent due to the passage of time and, if so, moving the (now urgent) entries to the resource queue 312. Note that other periodic rates may be used. Alternatively, it is also possible to set an interrupt to perform the processing illustrated by the flow chart 400. In an embodiment herein, the interrupt could be set in response to an element being added to one of the source queues 314-316 for an amount of time corresponding to TBUi.

Processing begins at a first step 402 where an iteration variable, i, is set to one. The iteration variable i may be used to iterate through all of the sources, Si. Following the step 402 is a test step 404 where it is determined if i is greater than N, the number of sources. If not, then control transfers from the test step 404 to a test step 406 where it is determined if the difference between the current time and the last time an I/O operation was performed for the source Si is greater than TBUi. If so, then control transfers from the test step 406 to a step 408 where the element from the source queue i is moved to the resource queue 312.

Following the step 408 is a step 412 where the index variable i is incremented. Note that the step 412 is also reached from the step 406 if (CT−LT) is not greater than TBUi. Following the step 412, control transfers back to the step 404, discussed above, for another iteration. Note that, if it is determined at the step 404 that i, the index variable, is greater than N, the number of sources, then control transfers back to the step 402, discussed above, where i is reinitialized to iterate through all of the source queues again.

Although the system described herein uses tracks as a unit of data for certain purposes, it should be understood that other units of data (including, possibly, variable length units of data) may be used. This also applies to other data structures and data units. In an embodiment herein, the timer may be used to keep track of the actual passage of time (e.g., wall time). For example, the timer may represent the number of seconds (or milliseconds, minutes, hours, etc.) since the system was initialized. Alternatively, the timer it may represent the actual time of day in combination with the date.

Note that, in some instances, the order of steps in the flowcharts may be modified, where appropriate. The system described herein may be implemented using the hardware described herein, variations thereof, or any other appropriate hardware capable of providing the functionality described herein. Thus, for example, one or more storage devices having components as described herein may, alone or in combination with other devices, provide an appropriate platform that executes any of the steps described herein. The system described herein includes computer software, in a non-transitory computer readable medium, that executes any of the steps described herein. The computer-readable storage medium may be located on at least one of the directors 52a-52c.

While the invention has been disclosed in connection with various embodiments, modifications thereon will be readily apparent to those skilled in the art. Accordingly, the spirit and scope of the invention is set forth in the following claims.

What is claimed is:

1. A method of providing quality of service levels to a plurality of sources that perform access requests to a disk resource, comprising:
   providing a disk resource queue containing access requests for the disk resource;
   providing a source queue for each of the sources containing access requests generated by a corresponding one of the sources;
   determining if a new access request from a particular source is urgent according to a specified number of I/O operations per second for the particular source and a time since a previous access request from the particular source;
   adding the new access request to the disk resource queue if the new access request is urgent; and
   adding the new access request the source queue of the particular source if the new access request is not urgent and the length of the disk resource queue is greater than a predetermined queue depth value.

2. The method, according to claim 1, wherein a Time to Become Urgent (TBU) value is provided for each of the sources and wherein TBUi for source Si corresponds to the reciprocal of the specified I/O operations per second for Si.

3. The method, according to claim 2, wherein CT corresponds to a current time, LT corresponds to a time of previous access request for the particular source, and the new access request is deemed urgent if the difference between CT and LT is greater than TBUi for the particular source.

4. The method, according to claim 3, wherein, prior to determining if the new access request is urgent, LT is adjusted using the following formula:

$$LT=LT-\frac{1}{2}*\max(0,LT-TBUi).$$

5. The method, according to claim 1, wherein the predetermined queue depth is less than a queue depth corresponding to a response time that is less than an average response time specified for each of the sources.

6. The method, according to claim 1, further comprising:
   adding the new access request to the disk resource queue if the length of the disk resource queue is less than the predetermined queue depth value.

7. The method, according to claim 6, wherein the predetermined queue depth value varies according to the specified number of I/O operations per second for each of the sources.

8. The method, according to claim 7, further comprising:
   periodically recalculating the predetermined queue depth value using an actual response time for each of the sources.

9. The method, according to claim 8, wherein the period is one minute.

10. The method, according to claim 1, further comprising:
    reviewing access requests in the source queues; and
    moving an access request to the disk resource queue in response to the access request becoming urgent.

11. A non-transitory computer-readable medium containing software that provides quality of service levels to a plurality of sources performing access requests for a disk resource, the software comprising:
    executable code that determines if a new access request from a particular source is urgent according to a specified number of I/O operations per second for the particular source and a time since a previous access request from the particular source;
    executable code that adds the new access request to a disk resource queue that contains access requests for the disk resource if the new access request is urgent; and
    executable code that adds the new access request a source queue of the particular source if the new access request is not urgent and the length of the disk resource queue is greater than a predetermined queue depth value, wherein each of a plurality of source queues contains access requests generated by a corresponding one of the sources.

12. The non-transitory computer-readable medium, according to claim 11, wherein a Time to Become Urgent (TBU) value is provided for each of the sources and wherein TBUi for source Si corresponds to the reciprocal of the specified I/O operations per second for Si.

13. The non-transitory computer-readable medium, according to claim 12, wherein CT corresponds to a current time, LT corresponds to a time of previous access request for the particular source, and the new access request is deemed urgent if the difference between CT and LT is greater than TBUi for the particular source.

14. The non-transitory computer-readable medium, according to claim 13, wherein, prior to determining if the new access request is urgent, LT is adjusted using the following formula:

$$LT=LT-\frac{1}{2}*\max(0,LT-TBUi).$$

15. The non-transitory computer-readable medium, according to claim 11, wherein the predetermined queue depth is less than a queue depth corresponding to a response time that is less than an average response time specified for each of the sources.

16. The non-transitory computer-readable medium, according to claim 11, the software further comprising:
    executable code that adds the new access request to the disk resource queue if the length of the disk resource queue is less than the predetermined queue depth value.

17. The non-transitory computer-readable medium, according to claim 16, wherein the predetermined queue depth value varies according to the specified number of I/O operations per second for each of the sources.

18. The non-transitory computer-readable medium, according to claim 17, the software further comprising:

executable code that periodically recalculates the predetermined queue depth value using an actual response time for each of the sources.

19. The non-transitory computer-readable medium, according to claim 18, wherein the period is one minute.

20. The non-transitory computer-readable medium, according to claim 11, the software further comprising:
  executable code that reviews access requests in the source queues; and
  executable code that moves an access request to the disk resource queue in response to the access request becoming urgent.

\* \* \* \* \*

UNITED STATES PATENT AND TRADEMARK OFFICE
CERTIFICATE OF CORRECTION

PATENT NO. : 8,935,490 B1
APPLICATION NO. : 12/930101
DATED : January 13, 2015
INVENTOR(S) : Amnon Naamad et al.

It is certified that error appears in the above-identified patent and that said Letters Patent is hereby corrected as shown below:

In the Claims

Claim 1, column 15, line 42 should read:

--adding the new access request to the source queue of the--

Signed and Sealed this
Fifth Day of May, 2015

Michelle K. Lee
*Director of the United States Patent and Trademark Office*